United States Patent

Hoolhorst

[11] Patent Number: 6,050,492
[45] Date of Patent: Apr. 18, 2000

[54] ELECTRONIC CARD CARRIER AND READING DEVICE

[75] Inventor: Albert Hoolhorst, Aardenburg, Netherlands

[73] Assignee: Siemens Aktiengesellschaft, Munich, Germany

[21] Appl. No.: 08/935,146

[22] Filed: Sep. 22, 1997

[30] Foreign Application Priority Data

Sep. 20, 1996 [DE] Germany .................. 196 38 648

[51] Int. Cl.$^7$ .................................. G06K 13/00
[52] U.S. Cl. .......................... 235/475; 235/479
[58] Field of Search ................... 235/475, 479, 235/482, 483, 485, 486

[56] References Cited

U.S. PATENT DOCUMENTS 3,947,666 3/1976 Carlson ........................... 235/482 X
5,589,681 12/1996 Merlin et al. ..................... 235/482

FOREIGN PATENT DOCUMENTS

0414390A1  2/1991  European Pat. Off. .
3343727A1  6/1985  Germany .
4008655A1  8/1991  Germany .
4029576C2  12/1994 Germany .

*Primary Examiner*—Karl D. Frech
*Attorney, Agent, or Firm*—Herbert L. Lerner; Laurence A. Greenberg; Werner H. Stemer

[57] ABSTRACT

A card reading device has a contact carrier part and a card carrier part. The card carrier part is formed with a card receiving portion into which the card to be read is inserted. The card carrier part, together with the card, is inserted at least partially into or onto the contact carrier part. The card carrier part has an elastically deformable tongue element which projects at least partially into and over the card receiving portion.

7 Claims, 2 Drawing Sheets

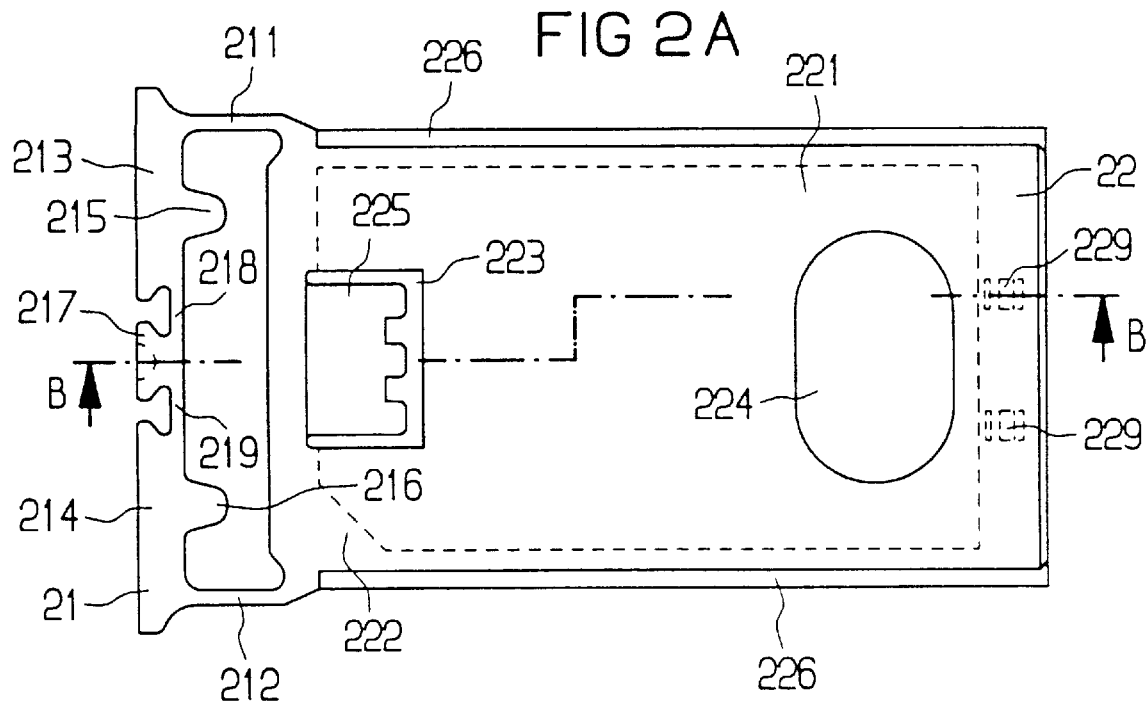
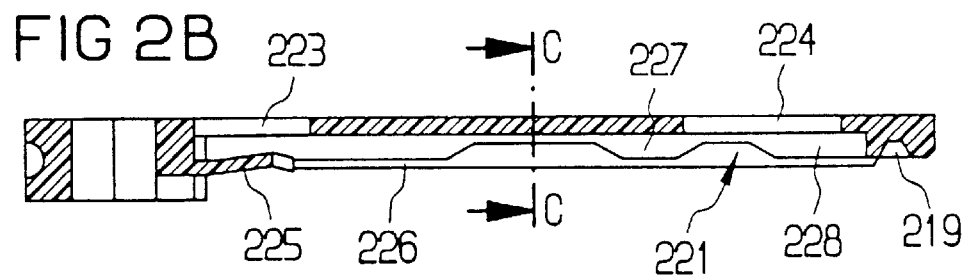
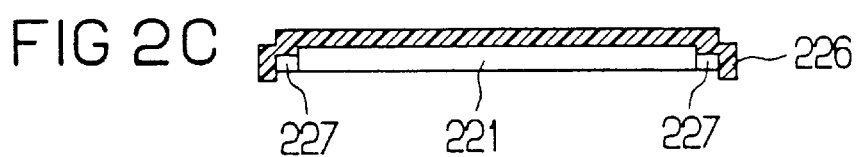

ELECTRONIC CARD CARRIER AND READING DEVICE

BACKGROUND OF THE INVENTION

Field of the Invention

The invention pertains to a card reading device or card reader with a contact carrier part and a card carrier part, the card carrier part being formed with a card receiving portion for receiving a card to be read; the card carrier part, together with the inserted card, can be pushed at least partially into or onto the contact carrier part.

Such card reading devices are, for example, the reading devices used in mobile telephones for receiving and/or passing on information provided by or for a so-called SIM card or a so-called SIM module.

SIM modules are used in mobile phones, in particular for subscriber identification. SIM is an acronym which stands for "Subscriber Identity Module". SIM modules are very well suited for use in mobile phones, in particular on account of their small dimensions (25×15 mm).

Card reading devices of the type presented herein may, however, also be card reading devices for reading "normal" chip cards.

The SIM modules, "normal" chip cards etc. which can be used in card reading devices are all cards containing chips, or chip cards, and, for the sake of simplicity, are henceforth referred to for short as cards; the operation of accepting and/or passing on information provided by or for a card is henceforth referred to, for the sake of simplicity, as reading the card.

Card reading devices, which comprise a contact carrier part and a card carrier part, which can be pushed into the latter or onto the latter, are well suited, inter alia, for use in mobile phones. This is so because, on the one hand, they are easy to operate and, on the other hand, they are very small.

Such card reading devices are easy to operate because the cards to be read can in each case be introduced into the card reading devices from outside, in other words without removing the battery or the like.

The card reading devices are small because, for example, the contact elements of the contact carrier part which are provided for establishing contact with the card to be read can be prevented from being short-circuited during the pushing in and removal of the card to be read into and out of the contact carrier part by the card essentially by a special configuration of the card carrier part alone, in other words without large and complex mechanics.

During the use of the prior art card readers of this type, however, it sometimes happens that the card to be read and/or the card reading device are damaged when the card carrier part containing the card to be read is pushed into the contact carrier part.

SUMMARY OF THE INVENTION

It is accordingly an object of the invention to provide a card reading device, which overcomes the above-mentioned disadvantages of the prior art devices and methods of this general type and which reliably prevents any possible damage to the card to be read and/or the card reading device during the insertion of the card carrier containing the card to be read into the contact carrier part.

With the foregoing and other objects in view there is provided, in accordance with the invention, a card reading device, comprising: a contact carrier part; a card carrier part formed with a card receiving portion for receiving a card to be read in the card reading device, the card carrier part, with the card inserted in the card receiving portion, being adapted to be inserted at least partially into or onto the contact carrier part; the card carrier part being formed with an elastically deformable tongue element extending at least partially over the card receiving portion.

In other words, the objects of the invention are attained in that the card carrier part is formed with an elastically deformable tongue element that extends at least partially over the card receiving portion.

In accordance with an added feature of the invention, the card receiving portion has a trough-like depression formed therein with a shape adapted to the shape of the card to be read.

In accordance with an additional feature of the invention, the tongue element projects from an edge of the trough-like depression.

In accordance with another feature of the invention, a distance between the base of the trough-like depression and the tongue element corresponds approximately to a thickness of the card.

In accordance with a further feature of the invention, at least one opening is formed in the base of the trough-like depression through which the card can be pushed out of the trough-like depression.

In accordance with again an added feature of the invention, the card to be read is formed with a coding slope, the tongue element being disposed such that the card must be inserted in between the tongue element and the base of the trough-like depression with the coding slope in front.

In accordance with again another feature of the invention, the tongue element has a relatively small length and it is relatively wide.

In accordance with again an additional feature of the invention, the tongue element is disposed and formed such that a card inserted in the card carrier part is clamped in between the tongue element and the base of the trough-like depression.

In accordance with a concomitant feature of the invention, the card carrier part and the tongue element are an integrally formed one-piece unit.

As compared to the prior art systems, the tongue element makes it impossible to bring the card into its intended position simply by placing it onto a card supporting region on the card receiving portion which is adapted to the shape of the card. Instead, the card must be inserted (pushed) in between the tongue element and the card supporting area for proper placement in the card carrier part. This is advantageous for a variety of reasons.

One of the advantages is that, in the state in which it has been pushed in under the tongue element, the card is clamped between the element and the card supporting area, The card is thus secured against accidental removal from that position. The card which is properly inserted into the card carrier part can therefore—unlike in conventional card reading devices—not oppose the insertion of the card carrier part into or onto the contact carrier part. As a result, to the card and/or to the card reading device caused by cards which, although correctly inserted, have then slipped, can be reliably ruled out.

A further advantage of the claimed tongue element is that any insertion of the card into the card carrier part other than that the properly aligned insertion is either ruled out entirely or it is immediately identified without difficulty. If, for example, an attempt is made to insert the card into the card receiving portion without pushing it under the tongue element, the card comes to lie loosely on the tongue element. That situation is immediately identified without any doubt as an unintended position of the card. If, on the other hand, it is attempted to insert a coded card, i.e. a card having a coding slope or the like, the wrong way round, it cannot be pushed, or at least not fully, under the tongue element, which can likewise be identified without difficulty. The user of the card reading device according to the invention can see at a glance in both cases that the card has not been inserted as intended into the card carrier part and will therefore not attempt at all to push the card carrier part into the contact carrier part. As a result, damage to the card and/or to the card reading device caused by incorrectly inserted cards can also be reliably ruled out.

The invention described herein thus provides for a card reader in which damage to the card to be read and/or to the card reading device is ruled out to the greatest extent during the insertion of the card carrier part (with the card to be read) into the contact carrier part.

Other features which are considered as characteristic for the invention are set forth in the appended claims.

Although the invention is illustrated and described herein as embodied in a card reading device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing Figs.

BRIEF DESCRIPTION OF THE DRAWING

FIG. 2A is a plan view of a card carrier part of the card reading device according to the invention;

FIG. 2B is a sectional view of the card carrier part of FIG. 2A taken along the line B—B; and FIG. 2C is a sectional view of the card carrier part taken along the line C—C in FIG. 2B;

DESCRIPTION OF THE PREFERRED EMBODIMENTS

The card reading device described below is a card reading device (card reader) adapted to read SIM modules. This does not mean, however, that the invention is restricted to card reading devices provided for this purpose. It will be understood by those versed in this field that the invention can also be used with card reading devices for reading any other cards (chip cards).

In the exemplary embodiment illustrating the best mode, the card reading device comprises a contact carrier part and a card carrier part; the card to be read by the card reading device is inserted into the card carrier part and is pushed together with the latter into the contact carrier part.

Figure 1A:
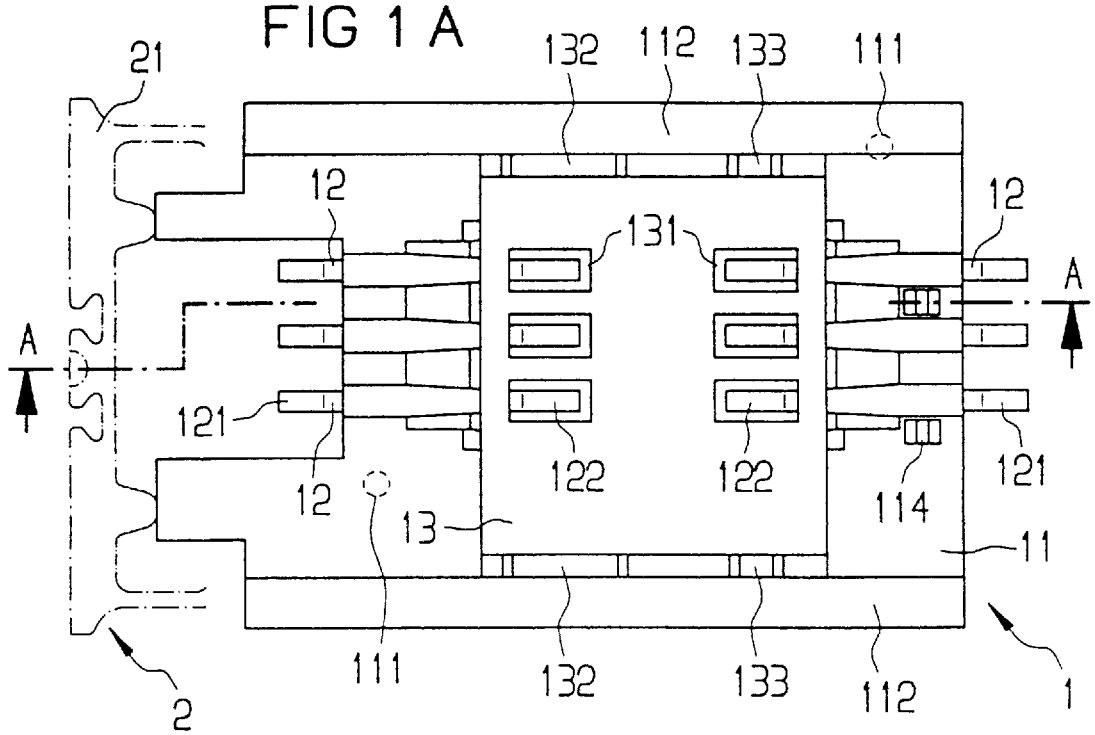
FIG. 1A is a plan view of a contact carrier part of a card reading device according to the invention.
Figure 1B:
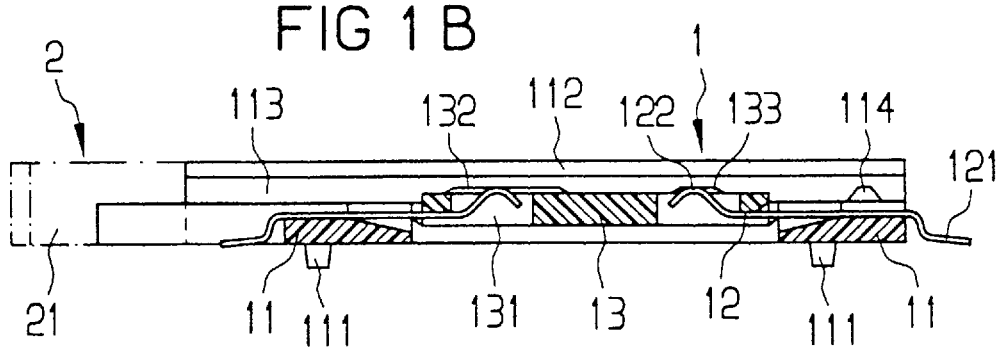
FIG. 1B is a sectional view of the contact carrier part of FIG. 1A taken along the line A—A.
Figure 1C:
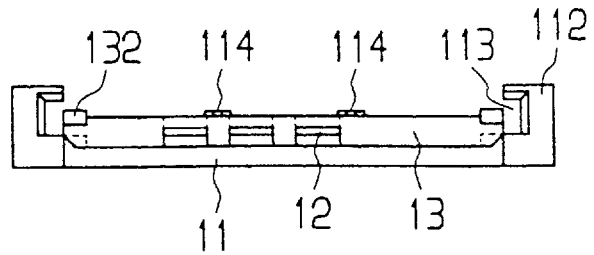
FIG. 1C is a side elevational view of the contact carrier part of FIGS. 1A and 1B.

Referring now to the Figs. of the drawing in detail and first, particularly, to FIGS. 1A, 1B, and 1C thereof, there is seen a contact carrier part denoted by reference numeral 1. The contact carrier part 1 comprises an insulator 11, six contact elements in the form of contact springs 12 and a contact element position-changing element in the form of a plate 13.

In FIGS. 1A and 1B, parts of the card carrier part 2, described in more detail later (see FIG. 2), are also represented by dashed lines in the position in which it has been pushed into the contact carrier part 1.

The contact carrier part 1, i.e., the insulator 11 and the contact springs 12 thereof, are adapted to be mounted on a non-illustrated electrical circuit board. The insulator 11 has for this purpose, as can be seen in particular from FIGS. 1A and 1B, mounting pins 111, which can be inserted into corresponding recesses in the electrical circuit board and, if need be, can also be fastened there. The contact springs 12 are formed at one of their respective ends as soldering lugs 121, which can be soldered to the circuit board, for example using an SMT soldering process.

The insulator 11 is that component of the contact carrier part 1 which holds the latter together, to be more specific its other components, and makes it possible for it to interact in the intended way with the card carrier part 2.

The last-mentioned function of the insulator 11 may be performed by the latter, in particular, by the provision of groove-like clearances 113 in raised marginal portions 112 on mutually opposite sides of the insulator 11. The (mutually facing) groove-like clearances 113 may serve, as can be seen in particular from FIG. 1C, as a guide for the card carrier part 2 which is to be brought into engagement with the contact carrier part 1 (by pushing one over the other or one into the other) and is described in still further detail later. The direction along which the card carrier part 2 must be moved in relation to the contact carrier part 1 in order to be pushed into the latter is the direction running horizontally to the right in FIGS. 1A and 1B and into the plane of the drawing in FIG. 1C.

Each of the contact springs 12 has an elastically deformable (movable) dome-shaped end portion 122. The end portion 122 is in each case that part of the contact springs 12 by which the latter come into contact with the contact regions (surface contacts) of the card(s) to be read.

The contact springs 12 are partially covered by the plate 13. The plate 13 has clearances 131, through which the end portions 122 of the contact springs 12 protrude.

The clearances 131 are positioned in such a way that the end portions 122 of the contact springs meet exactly with the contact regions of the card to be read when the latter is in its reading position within the card reading device. In the example considered—the card to be read is an SIM module—altogether there are provided six contact springs 12, which are arranged in two rows, each comprising three contact springs 12.

The plate 13 has on each of its sides facing the raised marginal portions 112 of the insulator 11 elevations 132 and 133, which extend essentially parallel to the raised marginal portions 112 at a small distance from them and, as can be seen in particular from FIGS. 1B and 1C, partially cover the groove-like clearances 113 provided in the marginal portions 112.

The elevations 132 and 133 of the plate 13 present an obstruction when the card carrier part 2 is pushed into the groove-like clearances 113 of the contact carrier part 1. The plate 13 can, however, as will be described in still more detail, be pressed out of the way toward the circuit board by the card carrier part 2. This has two effects: on the one hand, the card carrier part 2 can then be pushed essentially unhindered into the contact carrier part 1 and, on the other hand, the pressing away of the plate 13 causes not only the plate itself but also the contact springs 12 (in particular their end portions 122) to be pressed away.

The pressing away of the contact springs 12 is effected by the pressing away of the plate 13; the contact springs 12, to be more specific their end portions 122 in particular, are taken along by the plate 13.

The pressing away of the plate 13 by the card carrier part 2 is effected by elevations of the card carrier part 2, which run over the elevations 132 and 133 of the plate 13, pressing the latter away, when the card carrier part 2 is pushed into the contact carrier part 1. In order that the elevations of the card carrier part 2, which are inherently at the same height as the elevations 132 and 133 of the plate 13, can run over the latter with little resistance, the elevations 132 and 133 have, as can be seen in particular from FIG. 1B, run-up slopes at their front and rear ends.

In the state in which the card carrier part 2 has been pushed fully into the contact carrier part 1, a card (to be read) received in the card carrier part 2 is automatically in its reading position. In this state, the elevations of the card carrier part 2 have crossed over the elevations 132, 133 of the contact carrier part 1 to such an extent that the active pressing away of the plate 13 by the card carrier part 2 is ended. The plate 13 is pressed back in the direction of its original position by the spring force of the contact springs 12, to be precise until the latter, i.e., their dome-like end portions 122, reach the contact regions of the card to be read and thereby establish contact with them.

In order that the card carrier part 2 cannot simply fall out of the contact carrier part 1, the insulator part 11 of the contact carrier part 1 has one or more latching elements in the form of detents 114, which engage with assigned latching elements (latching depressions) of the card carrier part 2 in the state in which the card carrier part 2 has been pushed fully into the contact carrier part 1.

Referring now more specifically to FIGS. 2A, 2B and 2C, the card carrier part 2 is denoted by the reference numeral 2. The card carrier part 2 is of one-piece construction, it has an unlocking portion 21 and a card receiving portion 22.

With particular reference to FIG. 2A, the card receiving portion 22 is formed with a trough-like depression 221, which is represented there by dashed lines. The depression 221 serves as a card supporting area into which the card to be read can be inserted. The trough-like depression 221 is adapted to the shape of the card to be read. In accordance with the SIM modules to be used in the exemplary embodiment, it has a so-called coding slope 222, which prevents the SIM module from being placed into the trough-like depression 221 in the wrong orientation.

The base of the trough-like depression 221, as can be seen in particular from FIGS. 2A and 2B, has openings 223 and 224 formed therein, which make it possible to push a card inserted into the trough-like depression 221 out of the trough-like depression 221 from the remote side of the base and thereby remove the card from the card carrier part 2.

From the edge of the trough-like depression 221 there proceeds an elastically deformable (bendable) tongue element 225, which extends at least partially beyond the trough-like depression 221.

A card to be read must be pushed in between the tongue element 225 and the base of the trough-like depression 221 if it is to be inserted properly (as intended) into the card carrier part 2.

The distance between the tongue element 225 and the base of the trough-like depression 221 corresponds approximately to the thickness of the card to be inserted there.

As already mentioned above, the tongue element 225 is an elastically bendable member. That is, for inserting the card between the tongue element 225 and the base of the trough-like depression 221, the tongue element 225 can be bent elastically upward, and, in the state in which the card has been inserted as intended into the trough-like depression 221, the tongue element 225 presses the card against the base of the trough-like depression 221. This clamping action of the tongue element 225 and, furthermore, the above-mentioned fact that the trough-like depression 221 is adapted to the shape of the card(s) to be read provide the card in the state in which it has been inserted as intended with a seating in which it is secured against slipping or being displaced in any direction.

Once a card has been inserted as intended into the card carrier part 2, it can no longer leave the position assumed without a quite deliberate action from outside. The card carrier part 2 containing the card to be read can therefore be pushed into the contact carrier part 1 without the card suddenly being in the way. As a result, damage to the card and/or to the card reading device caused by cards which, although correctly inserted, have slipped or been displaced can be reliably ruled out.

On the other hand, however, it is also possible to identify immediately without difficulty if the card to be read has not been inserted as intended and fully between the tongue element 225 and the base of the trough-like depression 221. This is so because the card then either lies loosely on the tongue element 225 or projects at least partially over the edge of the trough-like depression 221. Both of the states mentioned are immediately obvious and indicate to the user of the card reading device that the card to be read has not yet been inserted as intended into the card carrier part 2.

The tongue element 221 is preferably provided at a point which lies alongside the coding slope 222 of the trough-like depression 221. In other words, the coding slope is preferably arranged in such a way that it requires the card to be pushed in with its coding slope in front. If the card is introduced the wrong way round into a card carrier part of such a construction, a portion of the card which does not have a coding slope strikes against the coding slope 222 of the trough-like depression 221 and can no longer be pushed in any farther. If the card has already gone partially under the tongue element 225 when it strikes against the coding slope 222, it also cannot come to lie with the portion having no coding slope on the coding slope 222. This is identifiably prevented by the distance between the tongue element 225 and the base of the trough-like depression 221, which corresponds only to approximately the thickness of the card. If, on the other hand, the card has not yet gone under the tongue element 225 when it strikes against the coding slope 222, it can indeed come to lie with the portion having no coding slope on the coding slope 222 of the trough-like depression 221, but this can in turn be identified without difficulty as an unintended position of the card.

It is thus clear that it may prove favorable to arrange and/or design the tongue element 225 in such a way that the card can pass between the tongue element 225 and the base of the trough-like depression 221 only when a correct insertion of the card is attempted into the trough-like depression 221. In the case of the arrangement of the tongue element 225 shown in FIG. 2, this can be accomplished, for example, by a correspondingly short design of the same.

It may furthermore prove to be favorable if the tongue element is fitted and/or designed in such a way that the card can be inserted between the tongue element 225 and the base of the trough-like depression 221 only from one specific direction. This can be achieved in the embodiment of FIG. 2, for example, when the element is particularly wide and/or if it is connected to the card carrier part 2 in the direct vicinity of the edge of the trough-like depression 221.

For the sake of completeness, it will also be understood by those skilled in this art that the card supporting area may be formed and bounded not only by the trough-like depression 221. Alternatively or additionally, the card supporting area may also be defined by ridges, wall-like elevations, or the like, running all or part way around it.

With particular reference to FIG. 2C, the card receiving portion 22 has raised marginal portions 226 on its sides facing the raised marginal portions 112 of the contact carrier part 1 when the card carrier part 2 is pushed into the contact carrier part 1.

The marginal portions 226 are shaped outward in such a way that, when the card carrier part 2 is pushed into the contact carrier part 1, they run in the groove-like clearances 113 of the contact carrier part 1 and are guided in them.

The inwardly facing regions of the marginal portions are, as can be seen in particular from FIGS. 2B and 2C, provided with elevations 227 and 228, which are positioned and shaped in such a way that, when the card carrier part 2 is pushed into the contact carrier part 1, they run over the elevations 132 and 133 of the plate 13 of the contact carrier part 1 and, accompanying this action, press the plate 13 together with the dome-like end portions 122 of the contact springs 12 of the contact carrier part 1 out of the pushing-in path. Like the elevations 132 and 133 of the contact carrier part 1, the elevations 227 and 228 of the card carrier part 2 are provided with run-up slopes.

The function and mode of operation of the elevations 227 and 228 and their interaction with the elevations 132 and 133 of the contact carrier part 1 have already been described at length in the description of the contact carrier part 1 and do not require any further explanation at this stage.

The card carrier part 2, to be more specific its card receiving portion 22, has at its front end, with respect to the insertion direction, one or more latching elements in the form of latching depressions 229, which engage with the detents 114 of the contact carrier part 1 in the state in which the card carrier part 2 has been pushed into the contact carrier part 1 and, as a result, prevent unintentional removal of the card carrier part 2 from the contact carrier part 1.

The releasing of this latching connection can be accomplished with the aid of the previously mentioned unlocking portion 21 of the card carrier part 2. Additional information in this regard is found in my copending applications Serial Nos. (Atty. Docket Nos. GR96P2191 and GR96P2192), which are herewith incorporated by reference.

The unlocking portion 21 is connected by two elastically deformable (bendable) connecting elements 211 and 212 to the card receiving portion 22. Apart from the connecting elements 211 and 212, the unlocking portion 21 also has two adjacent rocker levers 213 and 214 and a rocker lever actuating portion therebetween. The connecting elements 211 and 212 are connected to the mutually averted arms of the rocker levers 213 and 214.

The rocker levers 213 and 214 have supporting elements 215 and 216, respectively, which strike against the contact carrier part 1 in the state in which the card carrier part 2 has been pushed into the contact carrier part 1.

The rocker lever actuating portion comprises a pressure-applying portion 217 and two elastically deformable (bendable) connecting elements 218 and 219; the connecting elements 218 and 219 connect the pressure-applying portion 217 to the mutually facing arms of the rocker levers 213 and 214, respectively.

The mechanism is actuated by exerting a pressure force on the pressure-applying portion 217 (accessible from the outside). This can be accomplished, for example, by pressing a ballpoint pen or the like into a depression provided in the pressure-applying portion 217.

When exerting a pressure on the pressure-applying portion 217, the latter is displaced in the direction along the force vector. The elastically bendable connecting elements 218 and 219 follow the movement of the pressure-applying portion 217 and thereby pull on the arms of the rocker levers 213 and 214, to which they are connected. The pulling on the mutually facing arms of the rocker levers has the effect that the latter pivot in opposite directions about the supporting elements 215 and 216 striking against the contact carrier part 1. This in turn has the consequence that a tractive force acts on the connecting elements 211 and 212 which connect the mutually averted arms of the rocker levers 213 and 214 to the card receiving portion 22. This traction acting on the connecting elements 211 and 212 has the consequence that the latter pull on the card receiving portion 22 of the card carrier part 2. The pulling on the card receiving portion 22 causes the originally mutually engaged latching elements 114 and 229 to disengage, and the elevations 227 and 228 of the card carrier part 2 to pass more or less simultaneously over the elevations 132 and 133 of the plate 13 of the contact carrier part 1. As a result, the card carrier part 2 (its card receiving portion 22) is pulled part of the way out of the contact carrier part 1, while pressing the plate 13 away.

If the pressure exerted on the pressure-applying portion 217 is then removed, the elastically deformed unlocking portion 21 relaxes, and the entire card carrier part 2 is then so far out of the unit containing the card reading device that it can be pulled out completely from the contact carrier part 1 manually by gripping the protruding part, i.e. by gripping the unlocking portion 21. The plate 13 and the contact springs 12 are thereby held in a position kept at a distance from the surface of the card, as when the card part 2 is pushed into the contact carrier part 1.

Both during the insertion of the card carrier part 2 into the contact carrier part 1 and during the removal of the card carrier part 2 from the contact carrier part 1, the card inserted into the card carrier part 2 always remains in its intended position within the card carrier part 2. As a result, the risk of damage to the card to be read and/or to be card reading device when pushing together and separating the contact carrier part 1 and the card carrier part 2 can be eliminated virtually completely.

I claim:

1. A card reading device, comprising:
  a contact carrier part;
  a card carrier part formed with a card receiving portion for receiving a card to be read in the card reading device, said card carrier part, with the card inserted in said card receiving portion, being adapted to be inserted at least partially into or onto said contact carrier part;
  a trough-like depression formed in said card receiving portion, said trough-like depression having a shape adapted to a shape of the card to be read;
  said card carrier part being formed with an elastically deformable tongue element extending at least partially over said card receiving portion, said tongue element being disposed and formed such that a card inserted in said card carrier part is clamped in between said tongue element and a base of said trough-like depression.

2. The card reading device according to claim 1, wherein said tongue element projects from an edge of said trough-like depression.

3. The card reading device according to claim 1, wherein the card to be read has a given thickness, and a distance between a base of said trough-like depression and said tongue element substantially corresponding to the given thickness of the card.

4. The card reading device according to claim 1, wherein said trough-like depression has a base formed with at least one opening, whereby the card can be pushed out of the trough-like depression through said opening.

5. The card reading device according to claim 1, wherein the card to be read is formed with a coding slope and wherein said trough-like depression has a base, said tongue element being disposed such that the card must be inserted in between said tongue element and said base of said trough-like depression with the coding slope in front.

6. The card reading device according to claim 1, wherein said tongue element has a length being smaller than a width thereof.

7. The card reading device according to claim 1, wherein said card carrier part and said tongue element are an integrally formed one-piece unit.

* * * * *